(12) United States Patent
Li

(10) Patent No.: US 9,459,592 B2
(45) Date of Patent: Oct. 4, 2016

(54) METHOD FOR TIME AND TIME ZONE SYNCHRONIZATION AND TERMINAL DEVICE

(71) Applicant: Huawei Device Co., Ltd., Shenzhen (CN)

(72) Inventor: You Li, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/901,828

(22) PCT Filed: Dec. 2, 2014

(86) PCT No.: PCT/CN2014/092814
§ 371 (c)(1),
(2) Date: Dec. 29, 2015

(87) PCT Pub. No.: WO2015/081851
PCT Pub. Date: Jun. 11, 2015

(65) Prior Publication Data
US 2016/0161923 A1    Jun. 9, 2016

(30) Foreign Application Priority Data

Dec. 5, 2013 (CN) .......................... 2013 1 0652904

(51) Int. Cl.
*G04R 20/00* (2013.01)
*G04R 20/14* (2013.01)
(Continued)

(52) U.S. Cl.
CPC ................ *G04R 20/00* (2013.01); *G04G 7/00* (2013.01); *G04G 9/0076* (2013.01); *G04R 20/14* (2013.01); *H04W 4/021* (2013.01); *H04W 4/20* (2013.01); *H04W 60/00* (2013.01)

(58) Field of Classification Search
CPC ........ G04R 20/00; G04R 20/14; G04G 7/00; G04G 9/0076; H04W 4/021; H04W 4/20; H04W 60/00
See application file for complete search history.

(56) References Cited

U.S. PATENT DOCUMENTS 9,026,132 B2 * 5/2015 Wijayanathan ....... H04W 4/021
455/181.1
2006/0002236 A1   1/2006 Punkka
(Continued)

FOREIGN PATENT DOCUMENTS

CN      1717087 A      1/2006
CN      1859373 A      11/2006
(Continued)

OTHER PUBLICATIONS

Partial English Translation and Abstract of Chinese Patent Application No. CN1983314, May 3, 2016, 7 pages.
(Continued)

*Primary Examiner* — Vit W Miska
(74) *Attorney, Agent, or Firm* — Conley Rose, P.C.; Grant Rodolph; Nicholas K. Beaulieu

(57) ABSTRACT

A method for time and time zone synchronization and a terminal device. After a terminal registers with a network or roams to the network, the terminal determines whether the network supports a Network Identity and Time Zone (NITZ) function; and if the terminal determines that the network supports the NITZ function, the terminal prompts a user that uses the terminal to use a function of automatic time and time zone synchronization when automatic synchronization is not set for the terminal; or if the terminal determines that the network does not support the NITZ function, the terminal prompts a user that uses the terminal to manually configure time and a time zone. According to the present application, correctness of time and a time zone of the terminal can be ensured.

16 Claims, 3 Drawing Sheets

```
After a terminal registers with a network or roams to the        101
network, the terminal determines whether the network supports
            an NITZ function
                            |
                            v
If the terminal determines that the network supports the NITZ
function, the terminal prompts, when automatic synchronization
is not set for the terminal, a user that uses the terminal to use a    102
function of automatic time and time zone synchronization; or if
the terminal determines that the network does not support the
NITZ function, the terminal prompts a user that uses the terminal
         to manually configure time and a time zone
```

(51) Int. Cl.
*G04G 7/00* (2006.01)
*G04G 9/00* (2006.01)
*H04W 4/02* (2009.01)
*H04W 4/20* (2009.01)
*H04W 60/00* (2009.01)

(56) References Cited

U.S. PATENT DOCUMENTS

| | | | |
|---|---|---|---|
| 2007/0217291 | A1* | 9/2007 | Jeong ............... G04G 5/002 368/21 |
| 2008/0032736 | A1* | 2/2008 | Bari ............... H04W 12/06 455/552.1 |
| 2008/0081612 | A1 | 4/2008 | Seo et al. |
| 2013/0005337 | A1* | 1/2013 | Ali ............... H04W 4/02 455/435.1 |

FOREIGN PATENT DOCUMENTS

| | | |
|---|---|---|
| CN | 1983314 A | 6/2007 |
| CN | 101631375 A | 1/2010 |
| CN | 101795432 A | 8/2010 |
| CN | 102448030 A | 5/2012 |
| CN | 102685716 A | 9/2012 |
| CN | 102883071 A | 1/2013 |
| CN | 103686989 A | 3/2014 |
| WO | 2010109306 A1 | 9/2010 |

OTHER PUBLICATIONS

Partial English Translation and Abstract of Chinese Patent Application No. CN101631375, May 3, 2016, 8 pages.
Partial English Translation and Abstract of Chinese Patent Application No. CN101795432, May 5, 2016, 14 pages.
Partial English Translation and Abstract of Chinese Patent Application No. CN103686989, Dec. 23, 2015, 3 pages.
Partial English Translation and Abstract of Chinese Patent Application No. CN102448030, Part 1, Dec. 23, 2015, 5 pages.
Partial English Translation and Abstract of Chinese Patent Application No. CN102448030, Part 2, Dec. 23, 2015, 3 pages.
Partial English Translation and Abstract of Chinese Patent Application No. CN102883071, May 3, 2016, 9 pages.
Foreign Communication From a Counterpart Application, Chinese Application No. 201310652904.8, Chinese Office Action dated Apr. 5, 2016, 6 pages.
Foreign Communication From a Counterpart Application, PCT Application No. PCT/CN2014/092814, English Translation of International Search Report dated Mar. 2, 2015, 2 pages.
Foreign Communication From a Counterpart Application, PCT Application No. PCT/CN2014/092814, Written Opinion dated Mar. 2, 2015, 5 pages.

* cited by examiner

METHOD FOR TIME AND TIME ZONE SYNCHRONIZATION AND TERMINAL DEVICE

CROSS-REFERENCE TO RELATED APPLICATIONS

This application is a National Stage of International Application No. PCT/CN2014/092814, filed on Dec. 2, 2014, which claims priority to Chinese Patent Application No. 201310652904.8, filed on Dec. 5, 2013, both of which are hereby incorporated by reference in their entireties.

TECHNICAL FIELD

The present disclosure relates to communications technologies, and in particular, to a method for time and time zone synchronization and a terminal device.

BACKGROUND

Network time synchronization, or rather, a Network Identity and Time Zone (NITZ) function, means that in the 3rd Generation Partnership Project (3GPP) protocol, a network delivers information such as a network name and/or time and a time zone to a terminal using an Over-The-Air (OTA) message, so as to help the terminal automatically synchronize with network time, date, time zone, daylight saving time, and the like. The OTA message is not mandatory, and whether to deliver the OTA message may be configured on a network side.

A network time synchronization function is supported in Global System for Mobile Communications (GSM) and Wideband Code Division Multiple Access (WCDMA) networks. However, there are still many networks that do not support the network time synchronization function. In addition, the protocol does not specify that signaling of a network and a terminal carries a flag bit indicating whether the network supports the NITZ function. Therefore, the terminal does not know whether the network supports NITZ (or time synchronization), and the terminal cannot determine, according to the network, whether to perform time synchronization.

NITZ information is delivered to a mobile phone by a network using a mobility management message (Moving Management Information or MM INFO) in an OTA message. The message is delivered after the terminal interacts with a core network. For example, the message is delivered after registration is successful, or a location update is successful, or a Short Message Service (SMS) message, a call, packet data protocol (PDP) activation, or PDP deactivation is successful.

In the prior art, in operating systems of some terminals, a setting menu generally provides an option about whether to enable automatic time synchronization. If the automatic time synchronization is enabled, the terminals synchronize with network time using an OTA message delivered by a network. If the network does not support an NITZ function, some terminals complete time and time zone synchronization by accessing a specific server using a data service.

For a current design, if a terminal can use a data service, or a network supports an NITZ function, a mobile phone can synchronize with network time. However, if neither of the two conditions exists, the terminal cannot automatically synchronize with network time and time zone.

In addition, for a method for completing time synchronization using a data service, due to an extremely high fee of a data service used in a roaming scenario, a user generally disables the data service when roaming, and consequently when roaming, the user cannot determine whether to enable an automatic time synchronization function, such that the user still needs to set time, a date, and a time zone manually.

Moreover, in the prior art, because Code Division Multiple Access (CDMA) is a synchronization system, a terminal in a CDMA network synchronizes with time of a base station by default. In addition, in some countries and regions, the terminal in the CDMA network can roam to a GSM network. Therefore, for the terminal in the CDMA network, when the terminal roams to the GSM network, if automatic time and time zone synchronization is not enabled in a setting menu, the terminal does not synchronize with network time, thereby resulting in an error in settings of time and a time zone.

In conclusion, after a terminal registers with or roams to a network, it is possible that the terminal cannot use a function of automatic time and time zone synchronization.

SUMMARY

The present disclosure provides a method for time and time zone synchronization and a terminal device, so as to resolve a problem that after a terminal registers with or roams to a network, it is possible that the terminal cannot use a function of automatic time and time zone synchronization.

According to a first aspect, the present disclosure provides a method for time and time zone synchronization, including, after a terminal registers with a network or roams to the network, determining, by the terminal, whether the network supports a NITZ function; and if the terminal determines that the network supports the NITZ function, prompting, by the terminal when automatic synchronization is not set for the terminal, a user that uses the terminal to use a function of automatic time and time zone synchronization; or if the terminal determines that the network does not support the NITZ function, prompting, by the terminal, a user that uses the terminal to manually configure time and a time zone.

With reference to the first aspect, in a first possible implementation manner of the first aspect, the determining, by the terminal, whether the network supports an NITZ function includes determining, by the terminal according to NITZ information saved by the terminal, whether the network supports the NITZ function, where the NITZ information includes information about whether the network supports the NITZ function.

With reference to the first possible implementation manner of the first aspect, in a second possible implementation manner of the first aspect, the determining, by the terminal, whether the network supports an NITZ function further includes monitoring, by the terminal within preset duration, a mobility management message delivered by the network, so as to determine whether the network supports the NITZ function.

With reference to the second possible implementation manner of the first aspect, in a third possible implementation manner of the first aspect, the monitoring, by the terminal within preset duration, a mobility management message delivered by the network, so as to determine whether the network supports the NITZ function includes, when the terminal receives, within the preset duration, the mobility management message delivered by the network, determining, by the terminal, that the network supports the NITZ function; or when the terminal does not receive, within the preset duration, the mobility management message delivered by the network, determining, by the terminal, that the network does not support the NITZ function.

With reference to the third possible implementation manner of the first aspect, in a fourth possible implementation manner of the first aspect, the method further includes, after the terminal determines whether the network supports the NITZ function, saving, by the terminal, the information about whether the network supports the NITZ function into an NITZ information table.

According to a second aspect, the present disclosure provides a terminal device, including a determining module configured to, after the terminal device registers with a network or roams to the network, determine whether the network supports a NITZ function; and a prompting module configured to, when the determining module determines that the network supports the NITZ function, and automatic synchronization is not set for the terminal device, prompt a user that uses the terminal device to use a function of automatic time and time zone synchronization; or when the determining module determines that the network does not support the NITZ function, prompt a user that uses the terminal device to manually configure time and a time zone.

With reference to the second aspect, in a first possible implementation manner of the second aspect, the determining module is configured to determine, according to NITZ information saved by the terminal device, whether the network supports the NITZ function, where the NITZ information includes information about whether the network supports the NITZ function.

With reference to the first possible implementation manner of the second aspect, in a second possible implementation manner of the second aspect, the determining module is further configured to monitor, within preset duration, a mobility management message delivered by the network, so as to determine whether the network supports the NITZ function.

With reference to the second possible implementation manner of the second aspect, in a third possible implementation manner of the second aspect, the determining module is configured to, when the mobility management message delivered by the network is received within the preset duration, determine that the network supports the NITZ function; or when the mobility management message delivered by the network is not received within the preset duration, determine that the network does not support the NITZ function.

With reference to the third possible implementation manner of the second aspect, in a fourth possible implementation manner of the second aspect, the terminal device further includes a saving module configured to, after the determining module determines whether the network supports the NITZ function, save the information about whether the network supports the NITZ function into an NITZ information table.

Technical effects of the present disclosure are as follows: After registering with a network or roaming to the network, a terminal determines whether the network supports an NITZ function; if the terminal determines that the network supports the NITZ function, the terminal prompts, when automatic synchronization is not set for the terminal, a user that uses the terminal to use a function of automatic time and time zone synchronization; or if the terminal determines that the network does not support the NITZ function, the terminal prompts a user that uses the terminal to manually configure time and a time zone. In this way, after the terminal registers with or roams to the network, the user that uses the terminal can be promptly prompted to use the function of automatic time and time zone synchronization or manually configure the time and the time zone, thereby effectively ensuring correctness of the time and the time zone of the terminal.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
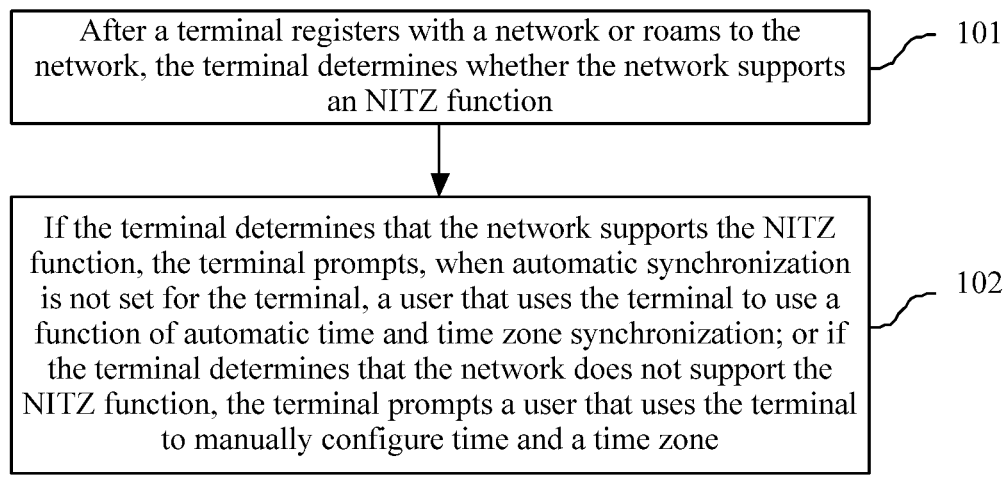
FIG. 1 is a flowchart of an embodiment of a method for time and time zone synchronization according to the present disclosure.

FIG. 1 is a flowchart of an embodiment of a method for time and time zone synchronization according to the present disclosure. As shown in FIG. 1, the method for time and time zone synchronization may include the following steps.

Step 101: After a terminal registers with a network or roams to the network, the terminal determines whether the network supports an NITZ function.

The terminal determining whether the network supports the NITZ function may be as follows: The terminal determines, according to NITZ information saved by the terminal, whether the network supports the NITZ function, where the NITZ information includes information about whether the network supports the NITZ function.

Further, the terminal may further monitor, within preset duration, a MM INFO delivered by the network, so as to determine whether the network supports the NITZ function.

The terminal monitoring, within the preset duration, the MM INFO delivered by the network, so as to determine whether the network supports the NITZ function may be as follows: When the terminal receives, within the preset duration, the MM INFO delivered by the network, the terminal determines that the network supports the NITZ function; or when the terminal does not receive, within the preset duration, the MM INFO delivered by the network, the terminal determines that the network does not support the NITZ function. During implementation, the preset duration may be manually set according to a performance requirement and an actual need. The preset duration is not limited in this embodiment. For example, the preset duration may be 10 seconds.

Further, in this embodiment, after the terminal determines whether the network supports the NITZ function, the terminal may further save the information about whether the network supports the NITZ function into an NITZ information table.

Step 102: If the terminal determines that the network supports the NITZ function, the terminal prompts, when automatic synchronization is not set for the terminal, a user that uses the terminal to use a function of automatic time and time zone synchronization; or if the terminal determines that the network does not support the NITZ function, the terminal prompts a user that uses the terminal to manually configure time and a time zone.

In the foregoing embodiment, after registering with or roaming to a network, a terminal determines whether the network supports an NITZ function; if the terminal determines that the network supports the NITZ function, the terminal prompts, when automatic synchronization is not set for the terminal, a user that uses the terminal to use a function of automatic time and time zone synchronization; or if the terminal determines that the network does not support the NITZ function, the terminal prompts a user that uses the terminal to manually configure time and a time zone. In this way, after the terminal registers with or roams to the network, the user that uses the terminal can be promptly prompted to use the function of automatic time and time zone synchronization or manually configure the time and the time zone, thereby effectively ensuring correctness of the time and the time zone of the terminal.

Figure 2:
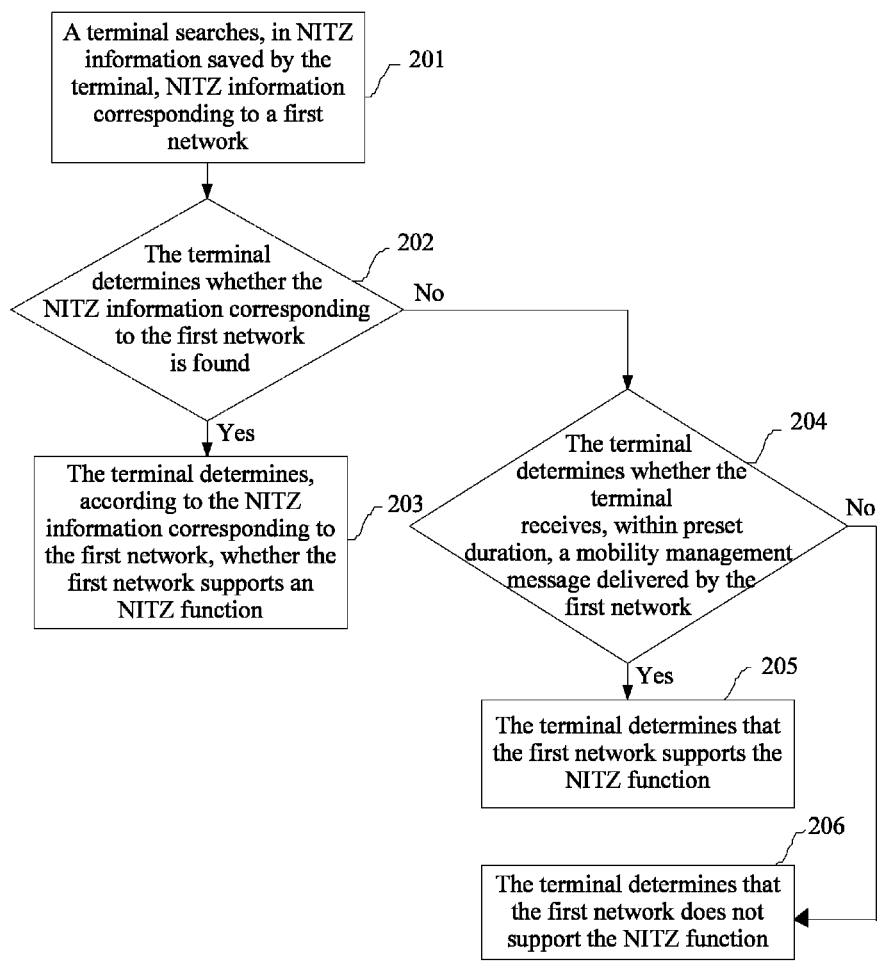
FIG. 2 is a flowchart of an embodiment in which a terminal determines whether a network supports an NITZ function according to the present disclosure.

FIG. 2 is a flowchart of an embodiment in which a terminal determines whether a network supports an NITZ function according to the present disclosure. This embodiment describes a process in which, after registering with or roaming to a first network, the terminal determines whether the first network supports the NITZ function. As shown in FIG. 2, the process may include the following steps.

Step 201: The terminal searches, in NITZ information saved by the terminal, NITZ information corresponding to the first network.

Step 202: The terminal determines whether the NITZ information corresponding to the first network is found, where if the NITZ information corresponding to the first network is found, step 203 is performed; or if the NITZ information corresponding to the first network is not found, step 204 is performed.

The NITZ information corresponding to the first network is used to indicate whether the first network supports the NITZ function.

That is, if the terminal can find the NITZ information corresponding to the first network, step 203 is performed. However, if the terminal cannot find the NITZ information corresponding to the first network, step 204 is performed, and whether the first network supports the NITZ function is determined by monitoring MM INFO.

Step 203: The terminal determines, according to the NITZ information corresponding to the first network, whether the first network supports the NITZ function.

More specifically, if the NITZ information corresponding to the first network indicates that the first network does not support the NITZ function, the terminal may determine that the first network does not support the NITZ function; or if the NITZ information corresponding to the first network indicates that the first network supports the NITZ function, the terminal may determine that the first network supports the NITZ function.

Step 204: The terminal determines whether the terminal receives, within preset duration, a mobility management message delivered by the first network, where if the terminal receives, within the preset duration, the mobility management message delivered by the first network, step 205 is performed; or if the terminal does not receive, within the preset duration, the mobility management message delivered by the first network, step 206 is performed.

During implementation, the preset duration may be manually set according to a performance requirement and an actual need. The preset duration is not limited in this embodiment. For example, the preset duration may be 10 seconds.

Step 205: The terminal determines that the first network supports the NITZ function.

Step 206: The terminal determines that the first network does not support the NITZ function.

Further, after the terminal determines whether the first network supports the NITZ function (that is, step 205 or step 206), the terminal saves information about whether the first network supports the NITZ function as the NITZ information corresponding to the first network. The terminal may save the information about whether the first network supports the NITZ function into an NITZ information table.

Because how soon the mobility management message of the network is sent after the terminal registers successfully is uncertain, there may be a delay in determining, by monitoring the mobility management message, whether the network supports the NITZ function. In addition, a possibility that the network does not deliver the mobility management message until a timer expires is not excluded, or it is possible that, due to a network configuration error or a network reason, the terminal does not receive the mobility management message during registration, and consequently, determining whether the network supports the NITZ function is inaccurate.

Therefore, in this embodiment, further, when the terminal does not receive, within the preset duration, the MM INFO delivered by the first network, the terminal determines that the first network does not support the NITZ function (that is, step 206); afterward, in the first network, after the preset duration expires and before the terminal powers off, if the terminal receives the MM INFO delivered by the first network, the terminal determines that the first network supports the NITZ function, and updates the NITZ information that is corresponding to the first network and is saved by the terminal to information that the first network supports the NITZ function; or in the first network, if the terminal does not receive, from beginning to end, the mobility management message delivered by the first network, and the terminal receives, when the terminal returns to the first network after the terminal registers with a second network other than the first network, the MM INFO delivered by the first network, the terminal determines that the first network supports the NITZ function, and updates the NITZ information that is corresponding to the first network and is saved by the terminal to information that the first network supports the NITZ function.

The terminal may locally maintain a list, for example, an NITZ information table, so as to record and maintain NITZ information corresponding to a network. A format of the NITZ information table may be as shown in Table 1. Table 1 is merely an example of the NITZ information table. The format of the NITZ information table is not limited in the present disclosure as long as the NITZ information table records and maintains the NITZ information corresponding to the network.

TABLE 1

| Field | Description |
|---|---|
| Public Land Mobile Network (PLMN) | Network ID |
| Type | GSM or WCDMA |
| NITZ | Support NITZ or not |

For example, it is assumed that, using the method provided in this embodiment of the present disclosure, the terminal determines that a GSM network of which a network ID is "46001" does not support an NITZ function, and the terminal does not save NITZ information corresponding to the GSM network of which the network ID is "46001". Then, the terminal adds, into Table 1, the NITZ information corresponding to the GSM network of which the network ID is "46001", as shown in Table 2.

TABLE 2

| Field | Description |
|---|---|
| PLMN | 46001 |
| Type | GSM |
| NITZ | Not supported |

However, afterward, in the GSM network of which the network ID is "46001", if the terminal does not receive MM INFO within preset duration, but the terminal receives the MM INFO after the preset duration expires, the terminal may determine that the GSM network of which the network ID is "46001" supports the NITZ function, and in this case, the terminal may update the NITZ information corresponding to the GSM network of which the network ID is "46001" to information that the GSM network of which the network ID is "46001" supports the NITZ function, as shown in Table 3; or in the GSM network of which the network ID is "46001", if the terminal does not receive MM INFO from beginning to end, and the terminal receives, when the terminal returns to the GSM network of which the network ID is "46001" after the terminal registers with a second network other than the GSM network of which the network ID is "46001", the MM INFO delivered by the GSM network of which the network ID is "46001", the terminal may determine that the GSM network of which the network ID is "46001" supports the NITZ function, and in this case, the terminal updates the NITZ information corresponding to the GSM network of which the network ID is "46001" to information that the GSM network of which the network ID is "46001" supports the NITZ function, as shown in Table 3.

TABLE 3

| Field | Description |
|---|---|
| PLMN | 46001 |
| Type | GSM |
| NITZ | Supported |

In addition, in the GSM network of which the network ID is "46001", if the terminal does not receive the MM INFO from beginning to end, but as the terminal roams to the second network other than the GSM network of which the network ID is "46001", the terminal receives MM INFO delivered by the second network, the terminal may determine that the second network supports an NITZ function. In this case, the terminal may update NITZ information corresponding to the second network to information that the second network supports the NITZ function.

In the present disclosure, after registering with or roaming to a first network, a terminal determines whether the first network supports an NITZ function; if the terminal determines that the first network supports the NITZ function, the terminal prompts, when automatic synchronization is not set for the terminal, a user that uses the terminal to use a function of automatic time and time zone synchronization; or if the terminal determines that the first network does not support the NITZ function, the terminal prompts a user that uses the terminal to manually configure time and a time zone. In this way, after the terminal registers with or roams to the network, the user that uses the terminal can be promptly prompted to use the function of automatic time and time zone synchronization or manually configure the time and the time zone, thereby effectively ensuring correctness of the time and the time zone of the terminal.

Persons of ordinary skill in the art may understand that all or some of the steps of the foregoing method embodiments may be implemented by a program instructing relevant hardware. The foregoing program may be stored in a computer-readable storage medium. When the program runs, the steps of the foregoing method embodiments are performed. The foregoing storage medium includes any medium that may store program code, such as a read-only memory (ROM), a random access memory (RAM), a magnetic disk, or an optical disc.

Figure 3:
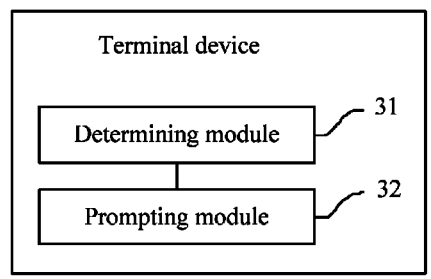
FIG. 3 is a schematic structural diagram of an embodiment of a terminal device according to the present disclosure.

FIG. 3 is a schematic structural diagram of an embodiment of a terminal device according to the present disclosure. The terminal device in this embodiment can implement a procedure of the embodiment shown in FIG. 1 of the present disclosure. As shown in FIG. 3, the terminal device may include a determining module 31 and a prompting module 32.

The determining module 31 is configured to, after the terminal device registers with a network or roams to the network, determine whether the network supports an NITZ function.

The prompting module 32 is configured to, when the determining module 31 determines that the network supports the NITZ function, and automatic synchronization is not set for the terminal device, prompt a user that uses the terminal device to use a function of automatic time and time zone synchronization; or when the determining module 31 determines that the network does not support the NITZ function, prompt a user that uses the terminal device to manually configure time and a time zone.

In this embodiment, the determining module 31 is configured to determine, according to NITZ information saved by the terminal device, whether the network supports the NITZ function, where the NITZ information includes information about whether the network supports the NITZ function. Further, the determining module 31 is further configured to monitor, within preset duration, MM INFO delivered by the network, so as to determine whether the network supports the NITZ function.

During implementation, the preset duration may be manually set according to a performance requirement and an actual need. The preset duration is not limited in this embodiment. For example, the preset duration may be 10 seconds.

The determining module 31 being further configured to monitor, within the preset duration, the MM INFO delivered by the network, so as to determine whether the network supports the NITZ function may be as follows: When the MM INFO delivered by the network is received within the preset duration, the determining module 31 determines that the network supports the NITZ function; or when the MM INFO delivered by the network is not received within the preset duration, determines that the network does not support the NITZ function.

According to the foregoing terminal device, after the terminal device registers with or roams to a network, a determining module 31 determines whether the network supports an NITZ function; if the determining module 31 determines that the network supports the NITZ function, a prompting module 32 prompts, when automatic synchronization is not set for the terminal device, a user that uses the terminal device to use a function of automatic time and time zone synchronization; or if the determining module 31 determines that the network does not support the NITZ function, the prompting module 32 prompts a user that uses the terminal device to manually configure time and a time zone. In this way, after the terminal device registers with or roams to the network, the user that uses the terminal device can be promptly prompted to use the function of automatic time and time zone synchronization or manually configure the time and the time zone, thereby effectively ensuring correctness of the time and the time zone of the terminal.

Figure 4:
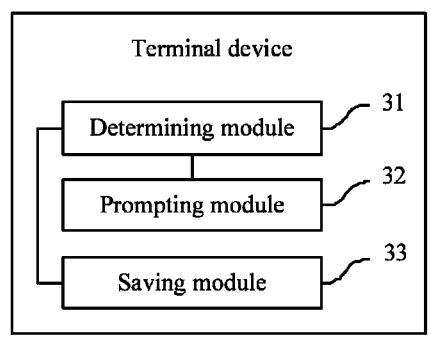
FIG. 4 is a schematic structural diagram of another embodiment of a terminal device according to the present disclosure.

FIG. 4 is a schematic structural diagram of another embodiment of a terminal device according to the present disclosure. A difference from the terminal device shown in FIG. 3 lies in that the terminal device shown in FIG. 4 may further include a saving module 33.

The saving module 33 is configured to, after the determining module 31 determines whether the network supports the NITZ function, save the information about whether the network supports the NITZ function into an NITZ information table.

More specifically, in the terminal device, an embodiment in which the determining module 31 determines whether the network supports the NITZ function may be as follows: The determining module 31 searches, in NITZ information saved by the terminal device, NITZ information corresponding to the network. The NITZ information corresponding to the network is used to indicate whether the network supports the NITZ function. If the NITZ information corresponding to the network is found, the determining module 31 may determine, according to the found NITZ information corresponding to the network, whether the network supports the NITZ function; or if the NITZ information corresponding to the network is not found, the determining module 31 may further determine whether the terminal receives, within the preset duration, the MM INFO delivered by the network. If it is determined that the terminal receives, within the preset duration, the MM INFO delivered by the network, the determining module 31 may determine that the network supports the NITZ function; or if it is determined that the terminal does not receive, within the preset duration, the MM INFO delivered by the network, the determining module 31 may determine that the network does not support the NITZ function.

Further, after the determining module 31 determines whether the network supports the NITZ function, the saving module 33 may save the information about whether the network supports the NITZ function as the NITZ information corresponding to the network. The saving module 33 may save the information about whether the network supports the NITZ function into the NITZ information table. In this embodiment, a format of the NITZ information table may be as shown in Table 1, and details are not repeatedly described herein.

Because how soon a mobility management message of the network is sent after the terminal device registers successfully is uncertain, there may be a delay in determining, by the determining module 31 by monitoring the MM INFO, whether the network supports the NITZ function. In addition, a possibility that the network does not deliver the MM INFO until a timer expires is not excluded, or it is possible that due to a network configuration error or a network reason, the terminal does not receive the MM INFO during registration, and consequently, determining, by the determining module 31, whether the network supports the NITZ function is inaccurate.

Therefore, in this embodiment, further, when the terminal device does not receive, within the preset duration, the MM INFO delivered by the network (for example, a first network), the determining module 31 determines that the first network does not support an NITZ function; afterward, in the first network, after the preset duration expires and before the terminal device powers off, if the terminal device receives the MM INFO delivered by the first network, the determining module 31 determines that the first network supports the NITZ function, and the saving module 33 updates saved NITZ information corresponding to the first network to information that the first network supports the NITZ function; or in the first network, if the terminal device does not receive, from beginning to end, the MM INFO delivered by the first network, and the terminal device receives, when the terminal device returns to the first network after the terminal device registers with a second network other than the first network, the MM INFO delivered by the first network, the determining module 31 determines that the first network supports the NITZ function, and the saving module 33 updates the saved NITZ information corresponding to the first network to information that the first network supports the NITZ function.

For an example in which the saving module 33 adds, into the NITZ information table, the NITZ information corresponding to the first network, refer to Table 2; and for an example in which the saving module 33 updates, in the NITZ information table, the NITZ information corresponding to the first network, refer to Table 3. Details are not repeatedly described herein.

According to the foregoing terminal device, after the terminal device registers with or roams to a network, a user that uses the terminal device can be promptly prompted to use a function of automatic time and time zone synchronization or manually configure time and a time zone, thereby effectively ensuring correctness of time and a time zone of the terminal.

Figure 5:
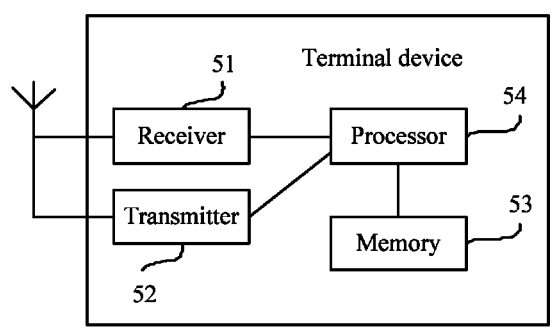
FIG. 5 is a schematic structural diagram of still another embodiment of a terminal device according to the present disclosure.

FIG. 5 is a schematic structural diagram of still another embodiment of a terminal device according to the present disclosure. The terminal device in this embodiment can implement a procedure of the embodiment shown in FIG. 1 of the present disclosure. As shown in FIG. 5, the terminal device may include a receiver 51, a transmitter 52, a memory 53, and a processor 54 that is connected to all of the receiver 51, the transmitter 52, and the memory 53. The terminal device may further include general-purpose components, such as an antenna, a baseband processing component, and an input/output component, and details are not described herein.

The memory 53 is configured to store program code.

The processor 54 is configured to invoke the program code stored in the memory 53, so as to, after the terminal device registers with a network or roams to the network, determine whether the network supports an NITZ function; if it is determined that the network supports the NITZ function, prompt, when automatic synchronization is not set for the terminal device, a user that uses the terminal device to use a function of automatic time and time zone synchronization; or if it is determined that the network does not support the NITZ function, prompt a user that uses the terminal device to manually configure time and a time zone.

In this embodiment, the processor 54 is configured to determine, according to NITZ information saved by the terminal device, whether the network supports the NITZ function, where the NITZ information includes information about whether the network supports the NITZ function. Further, the processor 54 is further configured to monitor, within preset duration, MM INFO delivered by the network, so as to determine whether the network supports the NITZ function.

During implementation, the preset duration may be manually set according to a performance requirement and an actual need. The preset duration is not limited in this embodiment, for example, the preset duration may be 10 seconds.

The processor 54 being further configured to monitor, within the preset duration, the MM INFO delivered by the network, so as to determine whether the network supports the NITZ function may be as follows: When the receiver 51 receives, within the preset duration, the MM INFO delivered by the network, the processor 54 determines that the network supports the NITZ function; or when the receiver 51 does not receive, within the preset duration, the MM INFO delivered by the network, the processor 54 determines that the network does not support the NITZ function.

Further, the processor 54 is further configured to, after determining whether the network supports the NITZ function, save the information about whether the network supports the NITZ function into an NITZ information table.

More specifically, in the terminal device, an embodiment in which the processor 54 determines whether the network supports the NITZ function may be as follows: The processor 54 searches, in the NITZ information saved by the terminal device, NITZ information corresponding to the network. The NITZ information corresponding to the network is used to indicate whether the network supports the NITZ function. If the NITZ information corresponding to the network is found, the processor 54 may determine, according to the found NITZ information corresponding to the network, whether the network supports the NITZ function; or if the NITZ information corresponding to the network is not found, the processor 54 may further determine whether the receiver 51 receives, within the preset duration, the MM INFO delivered by the network. If it is determined that the receiver 51 receives, within the preset duration, the MM INFO delivered by the network, the processor 54 may determine that the network supports the NITZ function; or if it is determined that the receiver 51 does not receive, within the preset duration, the MM INFO delivered by the network, the processor 54 may determine that the network does not support the NITZ function.

Further, after determining whether the network supports the NITZ function, the processor 54 may save the information about whether the network supports the NITZ function as the NITZ information corresponding to the network. The processor 54 may save the information about whether the network supports the NITZ function into the NITZ information table. In this embodiment, a format of the NITZ information table may be as shown in Table 1, and details are not repeatedly described herein.

Because how soon a mobility management message of the network is sent after the terminal device registers successfully is uncertain, there may be a delay in determining, by the processor 54 by monitoring the MM INFO, whether the network supports the NITZ function. In addition, a possibility that the network does not deliver the MM INFO until a timer expires is not excluded, or it is possible that due to a network configuration error or a network reason, the receiver 51 does not receive the MM INFO during registration, and consequently, determining, by the processor 54, whether the network supports the NITZ function is inaccurate.

Therefore, in this embodiment, further, when the receiver 51 does not receive, within the preset duration, the MM INFO delivered by the network (for example, a first network), the processor 54 determines that the first network does not support an NITZ function; afterward, in the first network, after the preset duration expires and before the terminal device powers off, if the receiver 51 receives the MM INFO delivered by the first network, the processor 54 determines that the first network supports the NITZ function, and updates saved NITZ information corresponding to the first network to information that the first network supports the NITZ function; or in the first network, if the receiver 51 does not receive, from beginning to end, the MM INFO delivered by the first network, and the receiver 51 receives, when the terminal device reruns to the first network after the terminal device registers with a second network other than the first network, the MM INFO delivered by the first network, the processor 54 determines that the first network supports the NITZ function, and updates the saved NITZ information corresponding to the first network to information that the first network supports the NITZ function.

For an example in which the processor 54 adds, into the NITZ information table, the NITZ information corresponding to the first network, refer to Table 2; and for an example in which the processor 54 updates, in the NITZ information table, the NITZ information corresponding to the first network, refer to Table 3. Details are not repeatedly described herein.

According to the foregoing terminal device, after the terminal device registers with a first network or roams to a first network, a processor 54 determines whether the first network supports an NITZ function; if it is determined that the first network supports the NITZ function, the processor 54 prompts, when automatic synchronization is not set for the terminal device, a user that uses the terminal device to use a function of automatic time and time zone synchronization; or if it is determined that the first network does not support the NITZ function, the processor 54 prompts a user that uses the terminal device to manually configure time and a time zone. In this way, after the terminal device registers with or roams to the network, the user that uses the terminal device can be promptly prompted to use the function of automatic time and time zone synchronization or manually configure the time and the time zone, thereby effectively ensuring correctness of the time and the time zone of the terminal.

Persons skilled in the art may understand that the accompanying drawings are merely schematic diagrams of exemplary embodiments, and modules or procedures in the accompanying drawings are not necessarily required for implementing the present disclosure.

Persons skilled in the art may understand that the modules in the apparatuses in the embodiments may be arranged in the apparatuses in the embodiments in a distributed manner according to the description of the embodiments, or may be arranged in one or more apparatuses that are different from those described in the embodiments. The modules in the foregoing embodiments may be combined into one module, or split into multiple submodules.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present disclosure.

What is claimed is:

1. A method for time and time zone synchronization, comprising:
   determining, by a terminal, whether a network supports a Network Identity and Time Zone (NITZ) function, after the terminal registers with the network or roams to the network; and
   prompting, by the terminal, a user that uses the terminal to use a function of automatic time and time zone synchronization, when the terminal determines that the network supports the NITZ function and automatic synchronization is not set for the terminal.

2. The method according to claim 1, the method further comprising prompting, by the terminal, the user that uses the terminal to manually configure time and a time zone, when the terminal dete mines that the network does not support the NITZ function.

3. The method according to claim 1, wherein determining, by the terminal, whether the network supports the NITZ function comprises determining, by the terminal according to NITZ information saved by the terminal, whether the network supports the NITZ function, wherein the NITZ information comprises information about whether the network supports the NITZ function.

4. The method according to claim 3, wherein determining, by the terminal, whether the network supports the NITZ function further comprises monitoring, by the terminal, within a preset duration, a mobility management information delivered by the network to determine whether the network supports the NITZ function.

5. The method according to claim 4, wherein monitoring, by the terminal, within the preset duration, the mobility management information delivered by the network to determine whether the network supports the NITZ function comprises determining, by the terminal, that the network supports the NITZ function, when the terminal receives, within the preset duration, the mobility management information delivered by the network.

6. The method according to claim 4, wherein monitoring, by the terminal, within the preset duration, the mobility management information delivered by the network to determine whether the network supports the NITZ function comprises determining, by the terminal, that the network does not support the NITZ function, when the terminal does not receive, within the preset duration, the mobility management information delivered by the network.

7. The method according to claim 5, further comprising saving, by the terminal, the information about whether the network supports the NITZ function into an NITZ information table, after the terminal determines whether the network supports the NITZ function.

8. The method according to claim 6, further comprising saving, by the terminal, the information about whether the network supports the NITZ function into an NITZ information table, after the terminal determines whether the network supports the NITZ function.

9. A terminal device, comprising:
   a memory storing instructions; and
   a processor coupled to the memory to execute the instructions to:
   determine whether a network supports a Network Identity and Time Zone (NITZ) function, after the terminal registers with the network or roams to the network; and
   prompt a user that uses the terminal to use a function of automatic time and time zone synchronization, when the processor determines that the network supports the NITZ function and automatic synchronization is not set for the terminal.

10. The terminal according to claim 9, wherein the processor further executes the instructions to prompt a user that uses the terminal to manually configure time and a time zone, when the processor determines that the network does not support the NITZ function.

11. The terminal according to claim 9, wherein determining whether the network supports the NITZ function comprises determining, according to NITZ information saved in the memory, whether the network supports the NITZ function, wherein the NITZ information comprises information about whether the network supports the NITZ function.

12. The terminal according to claim 11, wherein determining whether the network supports the NITZ function comprises monitoring, within a preset duration, a mobility management information delivered by the network to determine whether the network supports the NITZ function.

13. The terminal according to claim 12, wherein monitoring the mobility management information delivered by the network to determine whether the network supports the NITZ function comprises determining that the network supports the NITZ function, when the mobility management information delivered by the network was received within the preset duration.

14. The terminal according to claim 12, wherein monitoring the mobility management information delivered by the network to determine whether the network supports the NITZ function comprises determining that the network does not support the NITZ function, when the mobility management information delivered by the network was not received within the preset duration.

15. The terminal according to claim 13, wherein the processor further executes the instructions to save the information about whether the network supports the NITZ function into an NITZ information table, after the processor determines whether the network supports the NITZ function.

16. The terminal according to claim 14, wherein the processor further executes the instructions to save the information about whether the network supports the NITZ function into an NITZ information table, after the processor determines whether the network supports the NITZ function.

* * * * *